United States Patent [19]
Kemp et al.

[11] Patent Number: 6,113,778
[45] Date of Patent: *Sep. 5, 2000

[54] PRESSURE PLATE FILTER WITH HORIZONTAL FILTER PLATES

[75] Inventors: Geoffrey D. Kemp, Ontario; John Kemink, Bolton, both of Canada

[73] Assignee: Komline-Sanderson Limited, Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/963,175

[22] Filed: Nov. 3, 1997

[51] Int. Cl.[7] .............................. B01D 29/41; B01D 29/70
[52] U.S. Cl. .......................... 210/85; 210/328; 210/331; 210/332; 210/346
[58] Field of Search .................................... 210/106–108, 210/237, 328–332, 346, 391, 393, 85

[56] References Cited

U.S. PATENT DOCUMENTS

| | | |
|---|---|---|
| 1,070,473 | 8/1913 | Howson . |
| 1,858,160 | 5/1932 | Leek ........................................ 210/328 |
| 3,195,729 | 7/1965 | Kracklauer et al. ..................... 210/330 |
| 3,494,467 | 2/1970 | Paisley . |
| 3,593,853 | 7/1971 | Koethke . |
| 4,116,838 | 9/1978 | Lazzarotto . |
| 4,124,507 | 11/1978 | Mazzetti . |
| 4,717,485 | 1/1988 | Brunsell et al. . |
| 5,167,801 | 12/1992 | Kawasaki . |
| 5,271,851 | 12/1993 | Nelson et al. . |

FOREIGN PATENT DOCUMENTS

| | | |
|---|---|---|
| 343144 | 10/1921 | Germany . |
| 3640171 | 5/1988 | Germany .............................. 210/106 |
| 7908350 | 2/1980 | Netherlands . |
| 324803 | 2/1930 | United Kingdom . |

OTHER PUBLICATIONS

BHS Werk Sonthofen Filtrations–technik, Title: BHS Pressure Plate Filter (Brochure).

*Primary Examiner*—Matthew O. Savage
*Attorney, Agent, or Firm*—Young & Basile, P.C.

[57] ABSTRACT

A pressure plate filter having a filter vessel with an upper cylindrical section and a lowers downwardly tapering conical section. A stack of spaced-apart filter plates is mounted on a support frame within the filter vessel for pivoting about an offset axis between a lowered filtering position in which the filter plates are horizontally arranged within the conical sections to a raised filter cake discharge position in which the filter plates are supported above the conical section in a sloped position. The stack of filter plates is raised and lowered by means of a hoist assembly. In a further embodiment, the filter includes a separation frame which can move relative to the support frame and which causes the filter plates to move apart relative to each other when placed in the raised discharge position.

42 Claims, 8 Drawing Sheets

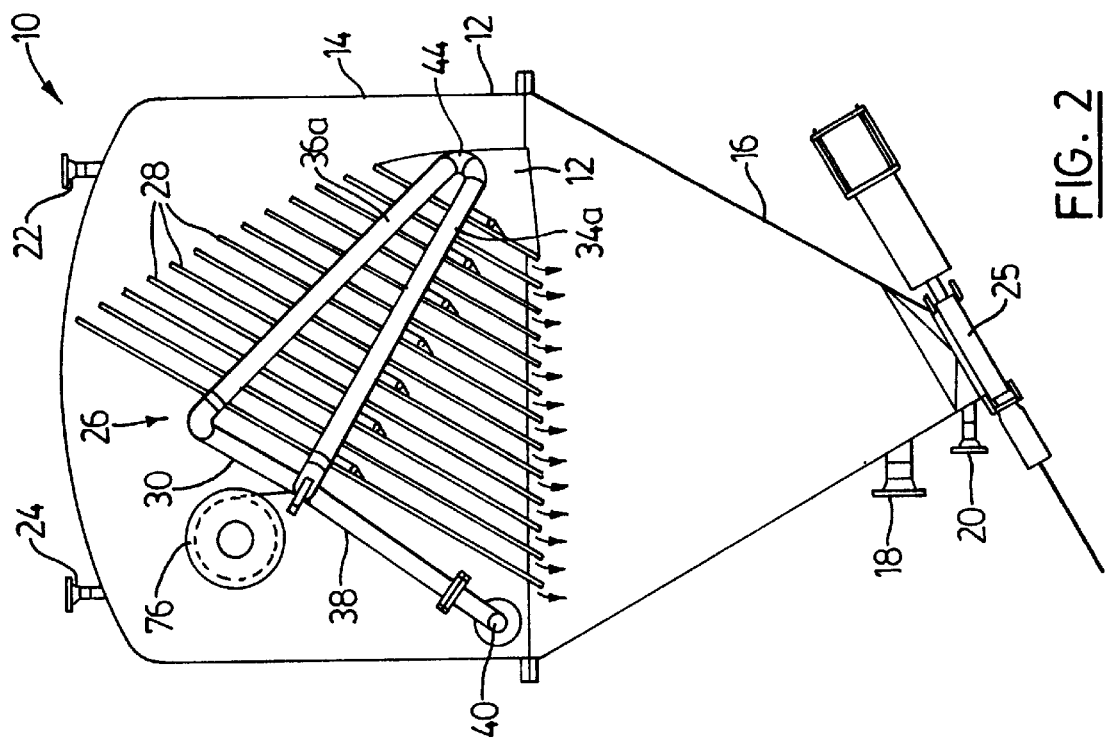
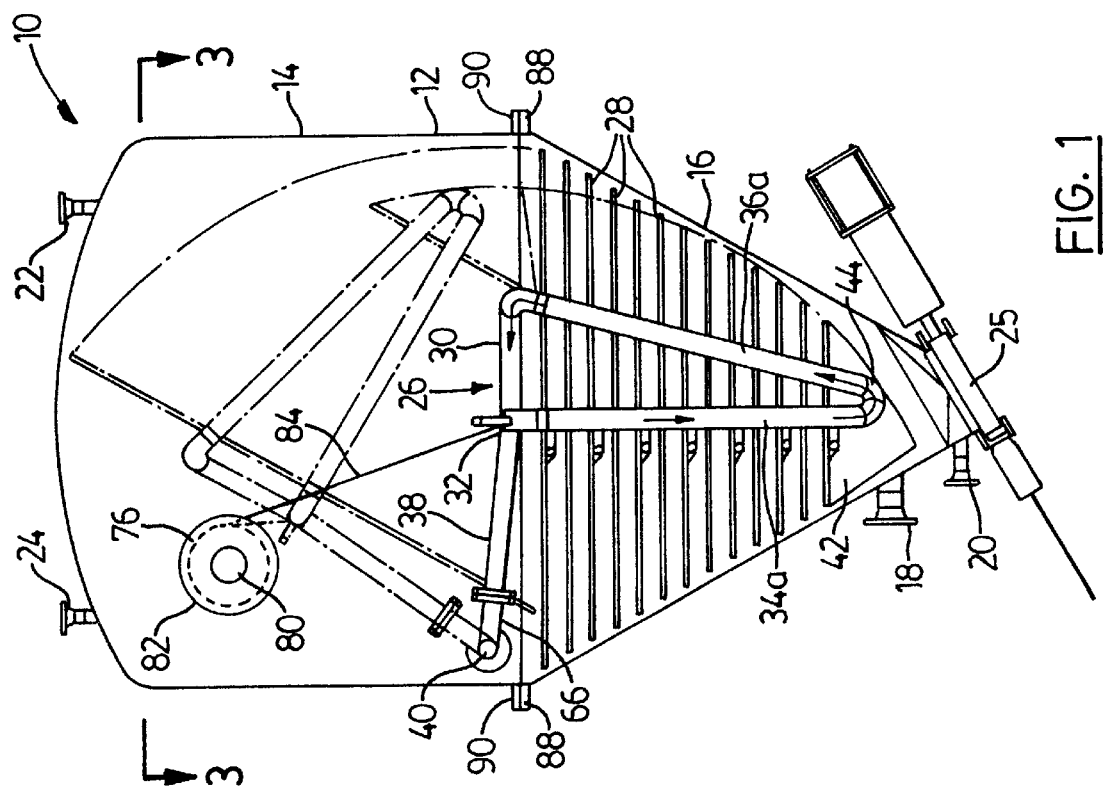

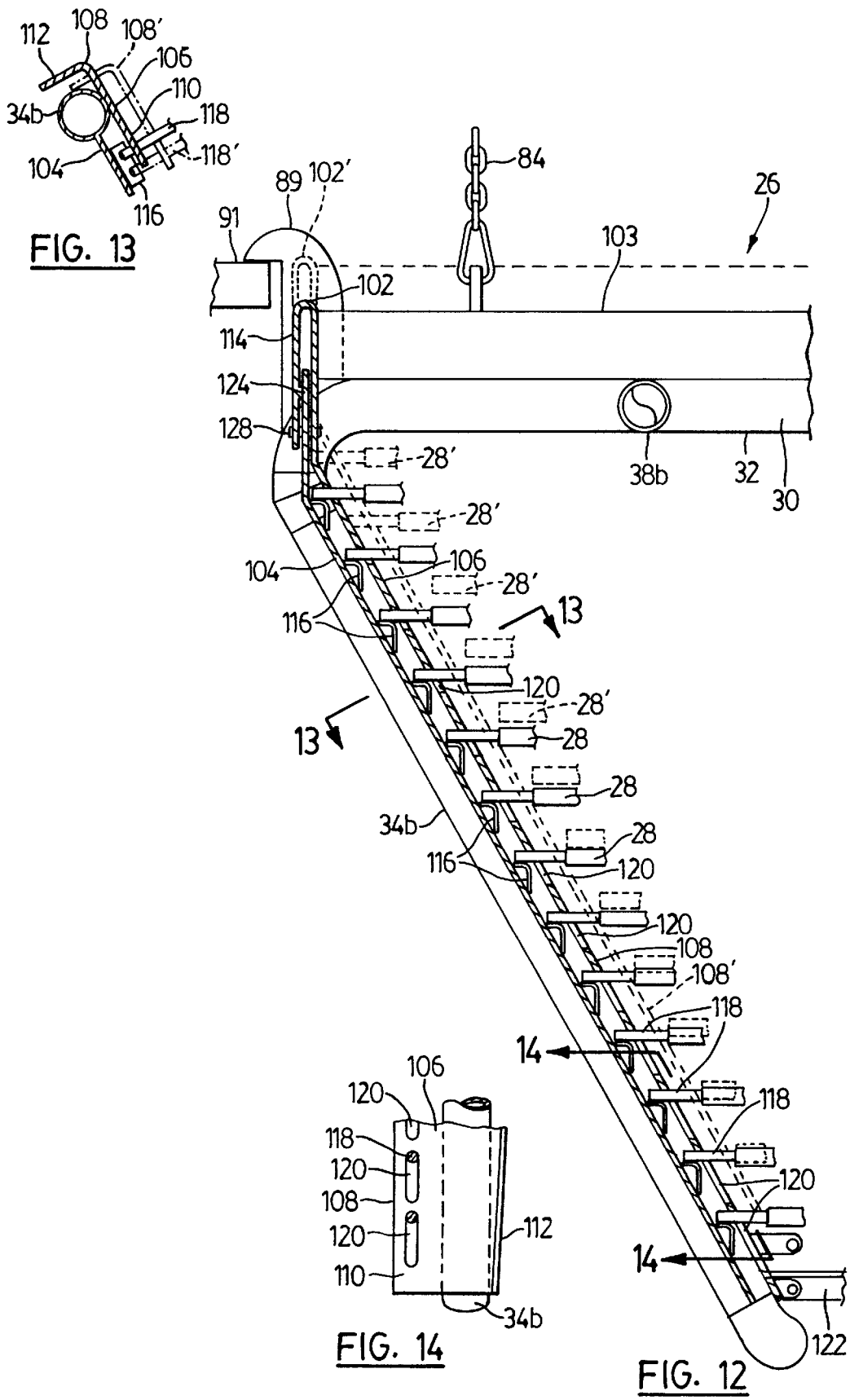

PRESSURE PLATE FILTER WITH HORIZONTAL FILTER PLATES

BACKGROUND OF THE INVENTION

The present invention relates to pressure plate filters with horizontally arranged filter plates.

Pressure plate filters have been in use for many years in a wide range of applications. When reliable discharge of dry filter cake is required it is often desirable to use a pressure plate filter having horizontally arranged filter plates as it allows the pressure within the filter vessel to be reduced without danger of filter cake falling from the surface of the filter plate. There are a number of commercially available pressure plate filters having horizontally arranged filter plates. For example, BHS SONTHOFEN of Germany produces a pressure plate filter having horizontally arranged filter elements with downward sloping filtration surfaces. Filter cake is shaken off the plates by oscillating the plates, causing the filter cake to slide off the filter plates. Another horizontally arranged filter is the FUNDA filter, available from Chemapec Inc. in the United States, in which dry filter cake is removed from horizontal filters by centrifugal force resulting from rotation of the filters.

The above-mentioned filters each have a conical section at the lower portion of their respective pressure filter vessels for collecting filter cake, and each requires a relatively large annular gap between the filter plates and the vessel wall for the filter cake to fall through. These empty spaces reduce the wash efficiency (wash efficiency being the amount of wash liquor used during a wash cycle relative to the amount of filter cake) of the filters as they are spaces which must be filled with wash liquor that is superfluous to the washing process.

The conical section provided in the above filters is used to direct filter cake towards a discharge opening located at the base of the filter vessels. However, the increasing diameter of the conical section causes the upward velocity of slurry introduced to the vessel to decrease as it rises up in the cone, which can result in large particles suspended in the slurry falling backwards into the base of the cone. In some cases, the large particles remain in the conical section and form a plug of wet solids in the lower portion thereof. Such an accumulation of solids impedes the discharge of the dry filter cake. The slurry or suspension that is left in the conical section at the end of the filtration cycle is referred to as the "heel". The "heel" left in the above filters is relatively large and as a result can be troublesome and time consuming to filter properly.

Another example of a horizontal pressure plate filter is disclosed in U.S. Pat. No. 3,494,467 issued Feb. 10, 1970 to D. Paisley and M. Schroeder which discloses a horizontal leaf dry cake discharge filter in which the entire filter housing is rotated by 90° in order to discharge cake from the filter elements. A screw feed within the housing is used to collect the discharged filter cake. Such a configuration requires enough room to allow the housing to rotate 90°. The housing also includes volumes which must be filled with wash liquor that are superfluous to the process.

It is thus desirable to provide a pressure plate filter with horizontally arranged filter plates which is cost effective to manufacture and operate, which provides an increased wash efficiency by minimizing empty spaces, and which reduces the amount of "heel" in the filter vessel.

SUMMARY OF THE INVENTION

According to one aspect of the present invention, a pressure plate filter comprises a filter vessel having a cylindrical top section, a conical, downwardly tapering bottom section, a slurry feed inlet for introducing slurry into the vessel, a filter cake discharge outlet located at the bottom section for removing filter cake from the vessel, a support frame, and a stack of spaced-apart parallel filter plates mounted on the support frame. The filter plates each have a porous substantially planar filtering surface. There is also provided filtrate collection and removal means for collecting filtrate from the filter plates and a pivot assembly pivotally mounting the support frame within the filter vessel for rotation between a lowered filtering position and a raised discharge position. In the filtering position the filtering surfaces extend substantially horizontally and at least some of the filter plates are located within the bottom section. In a discharge position, the filtering surfaces extend at a steep angle and filter cake on the discharge plates is discharged therefrom due to force of gravity when the filter is in use.

Preferably, the stack of filter plates extends from an upper portion of the bottom section to a lower portion of this section when the support frame is in the filtering position.

According to another aspect of the invention, a pressure plate filter includes a filter vessel having a cylindrical top section, a conical, downwardly tapering bottom section, a slurry feed inlet, a pressurized gas inlet, a filter cake discharge outlet, and a stack of spaced-apart parallel filter plates each having a substantially planar filtering surface. A support frame supports the filter plates and is mounted within the filter vessel for pivoting about a horizontal axis between a lowered filtering position and a raised filter cake discharge position. In the filtering position, the filtering surfaces extend substantially horizontally while in the discharge position these surfaces extend at a slope. The aforementioned horizontal axis is located above the bottom section and is offset to one side of a vertical central axis of the bottom section. There are also filtrate collection and removal means for collecting filtrate from the filter plates and removing the collected filtrate from the vessel.

According to a further aspect of the invention, a pressure plate filter is provided which comprises a filter vessel having a slurry inlet, a gas inlet and a filter cake discharge outlet, and a filter plate assembly having a stack of spaced apart filter plates each with a substantially planar filtering surface. The filter plate assembly is mounted within the filter vessel for pivoting between a lowered filtering position in which the filter plates are supported with their filtering surfaces extending substantially horizontally, to a raised discharge position in which the filter plates are supported with their filtering surfaces in a sloped position for discharge of filter cake from the filter plates. The filter plates are mounted such that the filter plates can be moved relative to each other between a first position and a second position, the filter plates being spaced further apart from each other in the second position than in the first position. The filter plate assembly includes filtrate passageways for collecting filtrate from the filter plates and discharging the collected filtrate outside of the filter vessel. The pressure plate filter includes an actuator for moving the filter plates from the first position to the second position and the filter plate assembly from the lowered filtering position to the raised discharge position.

Preferably, the filter plate assembly includes a support frame for supporting the filter plates and a separating frame connected to the actuator and mounted for movement relative to the support frame for moving the filter plates from the first position to the second position. The support frame may be pivotally mounted for rotation about a horizontal axis and the separating frame slidably mounted to the support frame such that when the filter plate assembly is in its lowered filtering position activation of the actuator causes the separating frame to move an initial predetermined distance relative to the support frame during which the filter plates are moved from their first position to their second position, and after the separating frame has moved the initial predetermined distance it engages the support frame, and the actuator causes the frames to rotate about the horizontal axis until the filter plate assembly is in its raised discharge position.

According to still another aspect of the invention, a pressure plate filter comprises an enclosed filter vessel having a top section, a tapering bottom section, a slurry feed inlet for introducing slurry into the vessel, and a filter cake discharge outlet located at the bottom section for removing filter cake from the vessel. A pivotal support frame is mounted in the vessel and extends vertically in the bottom section, this support frame being pivotal relative to and inside the vessel. A stack of spaced-apart parallel filter plates is mounted on the support frame and each has a porous, substantially planar filtering surface. There are also filtrate collection removal means for collecting filtrate from the filter plates. A pivot assembly pivotally mounts the support frame for pivoting the frame and the plates between a lowered filtering position in which the filtering surfaces extend substantially horizontally and a raised discharge position in which the filtering surfaces extend at a substantial angle to a horizontal plane so that filter cake on the filter plate falls therefrom under force of gravity. In the filtering position at least some of the filter plates are located within the bottom section. A lifting mechanism is capable of raising and lowering the support frame and the plates between the filtering position and the discharge position.

A detailed description of preferred embodiments is provided below with reference to the accompanying drawings.

BRIEF DESCRIPTION OF THE DRAWINGS

FIG. 1 is a cross-sectional side elevation of a first form of pressure plate filter constructed in accordance with the inventions this view showing the filter plates in a lowered, filtering position;

FIG. 2 is a cross-sectional side elevation of the pressure plate filter of FIG. 1, but showing the filter plates in a raised, filter cake discharge position;

FIG. 12 is a partial cross-sectional rear elevation of the pressure plate filter of FIG. 9;

FIG. 13 is a cross-sectional view taken along the line 13—13 of FIG. 12;

FIG. 14 is a cross-sectional view taken along the line 14—14 of FIG. 12; and

DESCRIPTION OF THE PREFERRED EMBODIMENTS

Figure 6:
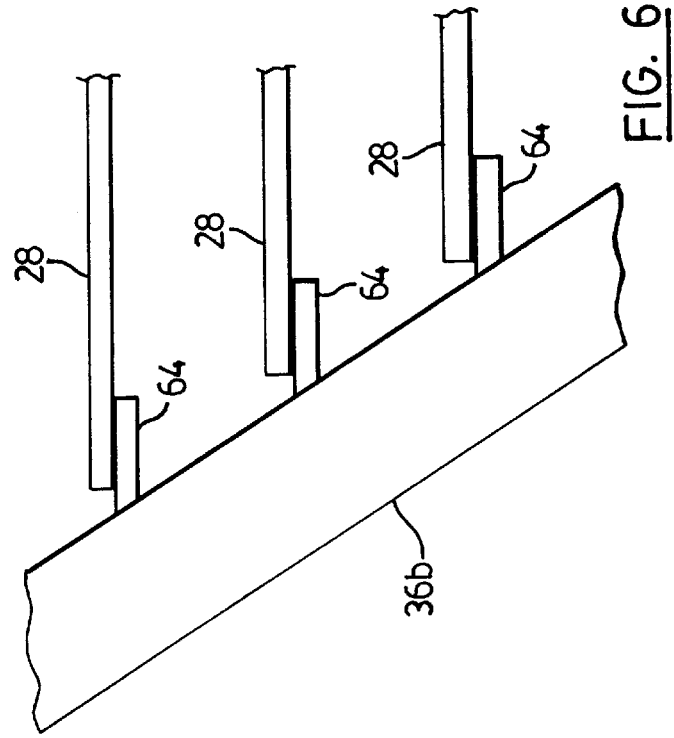
FIG. 6, which appears on the same sheet as FIG. 1, is a further partial rear elevation of the filter plate assembly of the pressure plate filter of FIG. 1.

FIG. 1 illustrates a pressure plate filter, indicated generally by 10, in accordance with a first preferred embodiment of the invention. The pressure plate filter 10 has a housing or filter vessel 12 with a cylindrical top section 14, and a conical, downwardly tapering bottom section 16. A slurry feed inlet 18 is located near the bottom of the conical section 16 for introducing slurry into the vessel 12. A slurry drain outlet 20 is located below the feed inlet 18. A gas inlet 22 is located in the top of the vessel 12 in order to allow the vessel 12 to be pressurized, and a gas release outlet 24 is also located in the top of the vessel 12 for reducing the vessel pressure and removing gas from the vessel. A filter cake discharge outlet 25 is located at the base of the conical section 16 for discharging filter cake from the vessel 12.

The pressure plate filter 10 includes a pressure plate assembly, indicated generally by 26, which is made up of a stack of parallel, spaced-apart filter plates 28 which are mounted on and supported by a rigid tubular support frame 30. In addition to supporting the filter plates 28, the tubular support frame includes a series of fluid passageways which act as a filtrate collection and removal system for filter plates 28. As will be explained in greater detail below, the pressure plate assembly 26 is mounted within the vessel 12 to rotate about a pivot assembly 40 between a lowered filtering position in which the filter plates 28 are horizontally arranged within the conical section 16 (as shown in FIG. 1), to a raised filter cake discharge position in which the filter plates 28 are supported at a steep angle above the conical section 16 (as shown in FIG. 2).

Figure 3:
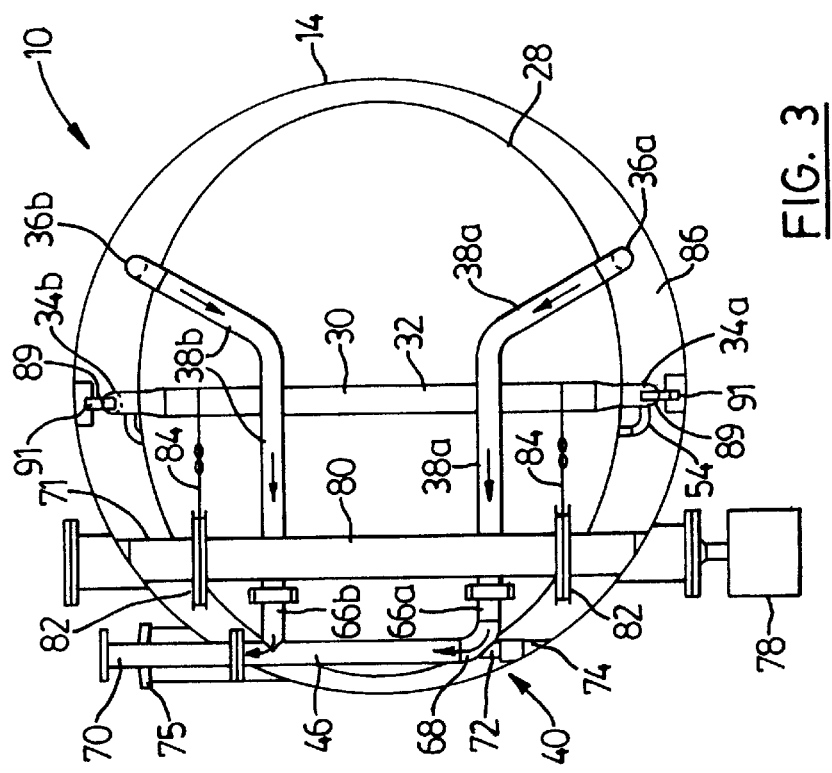
FIG. 3 is a cross-sectional view of the pressure plate filter of FIG. 1, taken along the line 3—3 of FIG. 1.
Figure 5:
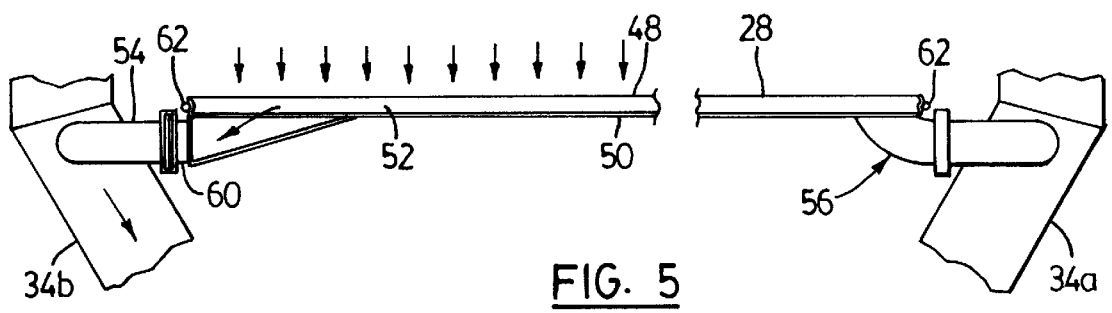
FIG. 5 is a partial rear elevation of the filter plate assembly of the pressure plate filter of FIG. 1.

As best seen in FIG. 3, which shows the top filter plate 28 in the filter plate assembly 26, the planar filter plates 28 are generally elliptical in shape. The outer circumferences of the successive filter plates 28 decrease in size from the top to the bottom of the filter plate assembly 26 corresponding to the decreasing diameter of the conical section 16. Referring to FIG. 5, in one preferred embodiment of the invention the filter plates 28 are each single sided filter plates having an upward facing permeable filtering surface 48 which is constructed from filter screen or filter cloth, and a lower tray member 50. A filtrate passageway 52 is formed between the filter cloth filtering surface 48 and the lower tray 50. The filter cloth of the filtering surface 48 is preferably secured to the tray 50 by a clamp wire 62 which extends around the outer peripheral edge of the tray 50.

When the filter plate assembly 26 is in its lowered filtering position, the filter plates 28 are horizontally arranged within the conical section 16 of the vessel 12 such that their corresponding filtering surfaces 48 extend horizontally. The filter plate assembly 26 preferably includes enough filter plates 28 so that the stack of filter plates extends from close to the top of the conical section 16 to close to the lowest point of the conical section 16 when in the lowered filtering position. A downwardly tapering plug 42 is secured to the filter plate assembly beneath the bottom filter plate 28 for reducing the open volume of the conical section 16 below the bottom filter plate 28.

Figure 4:
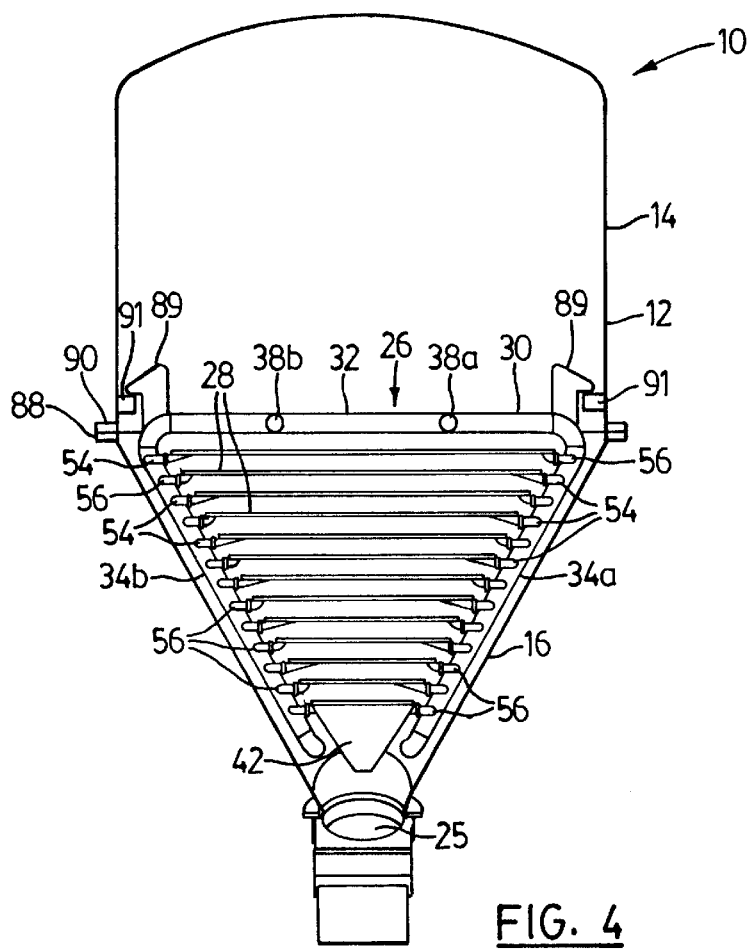
FIG. 4 is a cross-sectional rear elevation of the pressure plate filter of FIG. 1.

The tubular frame 30 which supports the stack of filter plates 28 includes two filtrate intake pipes 34a and 34b which extend along opposite side edges of the filter plates 28. The pipes 34a and 34b extend along the side edges of the filter plates 28 that are separated by the minor axis of the elliptical filter plates 28, and as best seen in FIG. 4, the pipes 34a and 34b together form a "V" shape which conforms generally to, but is spaced apart from, the walls of the conical section 16. The upper ends of the pipes 34a and 34b are connected together by a horizontally extending support member 32.

The tubular frame 30 includes two filtrate removal pipes 36a and 36b, which also extend along opposite sides of the filter plate assembly 26. The lower ends of the filtrate intake pipes 34a and 34b are connected by U-shaped pipe connecting sections 44 to the lower ends of the filtrate removal pipes 36a and 36b, respectively. The upper end of each of the filtrate removal pipes 36a and 36b is connected by a connecting pipe section 38a and 38b, respectively, to a pivoting pipe assembly 40 which includes a filtrate discharge pipe 46. The filtrate intake pipe 34a includes a fluid passageway formed therethrough which communicates, through connecting member 44, with a fluid passageway provided through the filtrate removal pipe 36a, which communicates with a fluid passageway through the connecting pipe section 38a, which opens into a fluid passageway provided through the discharge pipe 46. Similarly, the filtrate intake pipe 34b includes a fluid passageway formed therethrough which communicates, through its respective connecting member 44, with a fluid passageway provided through the filtrate removal pipe 36b, which communicates with a fluid passageway through the connecting pipe section 38b, which opens into the fluid passageway provided through the discharge pipe 46.

Each filter plate 28 is preferably connected along one side edge to one of the filtrate intake pipes 34a or 34b by a short connecting pipe section 54 and at its opposite side edge to the other of the filtrate intake pipes 34a or 34b by a supporting member 56 (see FIGS. 4 and 5). The filter plates 28 each include a short pipe connecting interface 60 for connecting it to its corresponding connecting pipe section 54. Each connecting pipe section 54 acts as a filtrate drain for its respective filter plate 28, and has a fluid passageway therethrough that communicates at one end with the fluid passageway through the filtrate intake pipe 34a or 34b, and at the other end (via the interface pipe 60) with the filtrate passageway 52 of its respective filter plate 28. Support members 56 do not have fluid passageways therethrough. As best seen in FIG. 4, the filtrate plate assembly 26 is preferably arranged such that the manner in which each successive plate is connected to the filtrate intake pipes 34a and 34b alternates. For example one side of the uppermost filter plate 28 is connected to the filtrate intake pipe 34b by a connecting pipe section 54, and the other side of the uppermost filter plate 28 is connected to the filtrate intake pipe 34a by a support member 56, whereas the next lower filter plate is connected in an opposite manner.

The connecting pipe sections 54 and the support members 56 are preferably releasably connected to their respective filter plates 28 in order that the filter plates 28 may be selectively removed from the filter plate assembly 26 for servicing and replacement as required.

In addition to being supported by the pipe sections 54 and support members 56, the filter plates 28 are each supported on two sides by support pins 64 which extend towards the centre of the vessel 12 from the filtrate removal pipes 36a and 36b (see FIG. 6).

The elliptical shape of the filter plates 28 allows the average annular space 86 between the outer peripheral edges of the plates 28 and the walls of the conical section 16 to be minimized, while at the same time providing clearance for the filtrate intake and removal pipes 34a, 34b, 36a, 36b which extend between the outer edges of the plates 28 and the walls of the vessel 12. In order to provide clearance for the filter plate assembly 26 to be rotated between its lowered and raised positions, the edges of the lower filter plates which are opposite to the pivot assembly 40 may be truncated somewhat.

With reference to FIGS. 1 and 3, the pivot assembly 40 will now be described in greater detail. The filtrate discharge pipe 46 of the assembly 40 is rotatably mounted to the vessel 12 and acts as a horizontal axis of rotation for the filtrate plate assembly 26 when the assembly 26 moves between its lowered filtering position and its raised filter cake discharge position. The axis of rotation for the filtrate plate assembly is located above the conical section 16, and is offset from the vertical centre of the conical section 16. The discharge pipe 46 is rigidly connected by short pipe sections 66a and 66b to the connecting pipe sections 38a and 38b respectively. The pipe sections 66a and 66b are preferably integrally formed with the discharge pipe 46 and are connected to the connecting pipe sections 38a and 38b with conventional flange style connections or other suitable connectors.

The discharge pipe 46 has a closed end 68 and an open end 70 through which filtrate collected during the filtering process can be discharged. In order to rotationally mount the filtrate discharge pipe 46 within the vessel 12, an axially extending pivot lug 72 extends outwardly from the sealed end 68 of the discharge pipe 46. The axially extending pivot lug 72 is received within a pivot lug receptacle or socket 74 which is provided on the inner wall of the vessel 12 at a location corresponding with the axis of rotation of the filter plate assembly 26. A sleeve bearing 75 supports the discharge end 70 of the discharge pipe 46. The juncture between the sleeve bearing 75 and the discharge end 70 is sealed with a mechanical or lip seal employing teflon or other suitable friction reducing and sealing material. The discharge end 70 can be connected to a suitable rotary joint (not shown) outside the vessel 12. It will also be appreciated that a rotary joint can be provided within the vessel 12 such that the filtrate discharge pipe exiting the vessel 12 does not rotate. However such an arrangement may be more difficult to maintain and detect leaks from.

In order to raise and lower the filter plate assembly 26, the pressure plate filter 10 includes a hoist assembly 76. The hoist assembly 76 has an external hoist actuator 78, which may be an electric motor, for rotating a hoist shaft 80 which is rotatably mounted within the vessel 12 along an axis of rotation which is parallel to the axis of rotation of the pivot assembly 40. The hoist shaft 80 is located generally above the pivot assembly 40.

Two pulley wheels 82 are mounted on the hoist shaft 80 for rotation therewith. Hoist lines 84, which are preferably formed from stainless steel chain links, extend between each of the pulley wheels 82 and the horizontal support member 32. Rotation of the hoist shaft 80 in a counter-clockwise direction (as illustrated in FIG. 1), causes the pulley wheels 82 to take up the hoist line 84, thereby raising the pressure plate assembly 26 to its filter cake discharge position (as illustrated in FIG. 2) and clockwise rotation of the hoist shaft 80 results in lowering of the pressure plate assembly 26. Preferably, the pulley wheels 82 have a diameter large enough in relation to the length of the hoist line 84 that only a partial revolution of the hoist 76 is required to fully raise or lower the filter plate assembly 26, thus reducing the risk of any entanglement or alignment problems.

Preferably the walls of the vessel 12, the tubular frame 30, the pivot assembly 40 and the components of the hoist 76 and other parts of the pressure plate filter 10 which are located within the vessel 12 are constructed from stainless steel or other corrosion resistant materials.

The cake discharge outlet 25, which truncates the base of the conical section 16, includes a normally closed opening through which filter cake can be discharged from the vessel 12. The cake discharge outlet 25 is preferably angled such that one side of the cake discharge opening is higher than the other side of the opening. The slurry drain outlet 20 is located on the side of the conical section 16 that is opposite the highest point of the cake discharge outlet 25, and positioned such that its opening is lower than the highest point of the filter cake discharge opening 25. The angled discharge outlet 25 and the corresponding placement of the slurry discharge outlet 20 allows any heel which forms in the base of the conical section 16 to be drained through the slurry drain outlet 20.

A pair of support lugs 91 are mounted within the vessel 12, one on each side of the cylindrical section 14, for supporting the filter plate assembly 26 in its lowered position. A hook-shaped support arm 89 is provided at each end of the horizontal support member 32 of the support frame 30 for engaging the support lugs 91 when the filter plate assembly 26 in its lowered position. The support arms 89 are located so that they lie substantially along the gravitational centre line of the filter plate assembly 26 when the assembly is in its lowered position so that the support lugs 91 will support substantially all the weight of the lowered assembly 26.

With reference to FIGS. 1 to 6, the operation of the filter plate assembly 10 is as follows. It will be appreciated by those skilled in the art that the filtering process in a horizontal plate pressure filter generally involves four cycles: a filtering cycle, a wash cycle, a drying cycle and a filter cake discharge cycle. At the start of the filtering process, during the filtering cycle the filter plate assembly 26 is in its lowered, filtering position as shown in FIG. 1. Slurry is fed into the vessel 12 through the slurry inlet 18, where it fills the conical section 16 from the bottom upwards. The slurry progresses upwards through the annular spaces 86 provided between the periphery of the plates 28 and the walls of the conical section 16, and fills the spaces between the plates 28 as it rises. Because the filter plates 28 are located within the conical section 16, with the lowest plate 28 being located just above the inlet pipe 18, the volume of the conical section 16 in which a "heel" can form is limited The presence of the plug 42 at the bottom of the filter plate assembly 26 further minimizes the space available for heel formation. Additionally, as the slurry can only flow upwards in the conical section 16 through the annular spaces 86, the upward velocity of the slurry is maintained at a relatively high level which helps to stop large dense particles from settling in the bottom of the cone.

Depending on the type of filtering being performed, the vessel 12 can be pressurized either while the slurry is being fed into the vessel 12, or after the desired amount of slurry is fed into the vessel 12. Pressure in the vessel 12 is maintained by pressurized gas (which is fed into the upper section 14 of the vessel through the gas inlet 22) and also by pumping slurry into the vessel. The pressure is the result of the resistance to fluid flow through the filter cake and the filtrate collection system. The pressure within the vessel 12 pressurizes the slurry located above the filtering surfaces 48 of the plates 28 with the result that filtrate is forced through the filtering surfaces 48, as indicated by the arrows in FIG. 5, and filter cake is collected on the filter cloth 48. Filtrate from the plates 28 passes through the connecting pipe sections 54 and into the filtrate intake pipes 34a and 34b. As illustrated by the arrows in FIG. 1, and FIG. 3, filtrate entering the filtrate intake pipes 34a and 34b flows into the filtrate removal pipes 36a and 36b, respectively, and then through the connecting pipe sections 38a and 38b to the filtrate discharge pipe 46, and out of the vessel 12 through the discharge end 70. Slurry remaining within the vessel 12 can be drained through the slurry drain outlet 20.

If desired, heel filtration can be carried out by recirculating the contents of the heel back to the slurry or suspension feed tank (not shown), and back into the filter vessel, until as much of the suspended solids as possible are removed from the recirculated slurry. At the end of the process, the amount of residue liquid left below the plate assembly 26 can be discharged via the outlet 20 to the location of choice. It will be appreciated that because the open volume below the plate assembly 26 is quite small, the amount of such residue liquid will also be small.

After filtering, the filter cake located on the filter plates 28 can be washed if required by filling the conical section 16 with a suitable wash liquor introduced through the slurry feed inlet 18. Because the filter plates 28 are located within the conical section 16, the volume of wash liquor required to clean the filter cake located on the plates 28 is less than it would be if the plates 28 were located above the conical section 16. The plug 42 further reduces the volume of wash liquor required for the cleaning cycle.

Preferably, during the filtering and washing cycles the upper section of the vessel 14 is maintained full of pressurized gas, and the lower portion of the vessel is filled to just above the highest filter plate with slurry, or wash liquor, as the case may be. Nonetheless, if the presence of gas within the vessel 12 chemically interferes with the substances being filtered, or if small quantities of gas dissolved in the filtrate is unacceptable, the vessel 12 can be completely filled with slurry or wash liquor during the filtering or washing cycles respectively.

At the end of the wash cycle, a drying cycle may occur in which the vessel 12 is pressurized with gas through the gas inlet 22. The gas passes through the filter cake present on the filter plates 28 and into the filtrate discharge system of the filter plate assembly 10, thus drying the filter cake present on the filter plates 28.

After the drying cycle, a filter cake discharge cycle occurs in which the hoist assembly 76 is activated to raise the filter plate assembly from its lowered, filtering position showed in FIG. 1 to its raised, cake discharge position as shown in FIG. 2. When the filter plate assembly is in its raised cake discharge position, the plates 28 are removed substantially out of the conical section 16 and raised into the upper section 14 of the vessel 12. As the plates 28 are rotated about the offset pivot assembly 40, they are pivoted into a steeply sloping cake discharge position in which the slope of the filter plate surfaces is equal to or greater than the angle of repose of most substances, with the result that the filter cake will be dislodged and fall into the conical section 16. In one preferred embodiment, the filtering surfaces 48 of the plates 28 are angled at greater than 50 degrees from the horizontal when the plate assembly is in its raised position. Typically, the filtering surfaces 48 of the plates 28 extend at and angle of between 50 to 60 degrees from the horizontal when the plate assembly 26 is in its raised position, although angles of less than 50 degrees or greater than 60 degrees may be satisfactory in some instances. If required, a blow back blast of gas can be provided through the filtrate discharge pipes to help dislodge the filter cake from the filter plate surfaces. Once the filter cake falls into the conical section 16, it can be discharged from the vessel through the filter cake discharge outlet 25. After the filter cake discharge cycle, the plates 26 can be lowered back to the filtering position.

It will be appreciated that because the filter cake is dislodged from the filter plates 28 by raising them, it is not necessary that a large space be provided between the edges of the plates and the walls of the vessel 12 when the plate assembly 26 is in its lowered filtering position. The annulus 86 need only be large enough to permit the slurry or wash liquor to migrate up the conical section 16 when pumped through the slurry inlet 18, and unlike the existing horizontal pressure plate filters discussed above which rely on centrifugal force or vibrations to dislodge the filter cake, the annulus 86 does not have to be large enough to allow the filter cake to fall between the edges of the plates 28 and the walls of the vessel 12. Because the unproductive volumes within the conical section 16 are minimized, the pressure plate filter 10 can provide an improved wash efficiency.

The upper cylindrical section 14 and lower conical section 16 of the vessel 12 are preferably separate sections. An annular flange 88 extends around the upper peripheral edge of the conical section 16, and a corresponding annular flange 90 is provided around a lower peripheral edge of the upper section 14. The upper section 14 and conical section 16 are secured together by a plurality of fasteners such as bolts and nuts (not shown) which pass through a number of co-axial holes provided through the flanges 88 and 90. In order to access the plate assembly 26 for maintenance purposes, the plate stack can be raised into the upper section 14 of the vessel, which is fixed in place. The conical section can then be removed, and the plate assembly 26 subsequently lowered to its filtering position, thus providing easy and clear access to the filter plate assembly 26. This configuration allows the pressure plate filter 10 to be used in buildings having a height lower than that required by other types of pressure plate filters which require sufficient height to lower the entire plate stack from the vessel or to remove the vessel from the plate stacks.

The filter cloth of the filtering surfaces 48 of each of the filter plates 28 preferably can be removed (and replaced) from each plate 28 individually by removing its respective clamp wire 62 without having to remove the filter plates from the filter plate assembly 26. It will be appreciated that alternate means could be used to attach the filter cloth or filtering screen to the filter plates. For example, the filter screen could be attached to the filter plate by welding, soldering or swaging or similar means that provides a seal between the filter screen and the filter plates.

Figure 7:
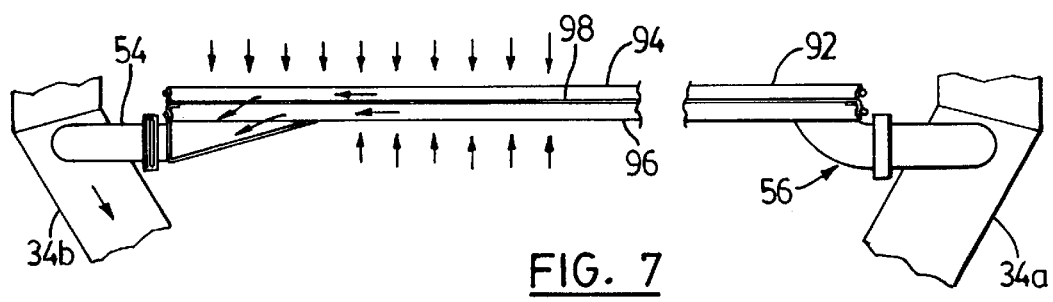
FIG. 7 is a partial rear elevation of a second type of filter plate assembly for use with the pressure plate filter of the present invention.

As described above, single sided filter plates 28 are used in the pressure plate filter 10. However, it is also possible that double sided filter plates could be used instead of single sided filter plates within the pressure plate filter 10. FIG. 7 illustrates a double sided filter plate 92 comprising an upward facing filter cloth filtering surface 94 and a downward facing filter cloth filtering surface 96. The filtering surfaces 94 and 96 are separated by a tray member 98 with a filtrate discharge channel being formed between each of the filtering surfaces 94 and 96 and the tray member 98. The double sided pressure plate filters 92 can be mounted to the pressure plate assembly 26 in the same manner that the single sided pressure plates 28 are.

Figure 8:
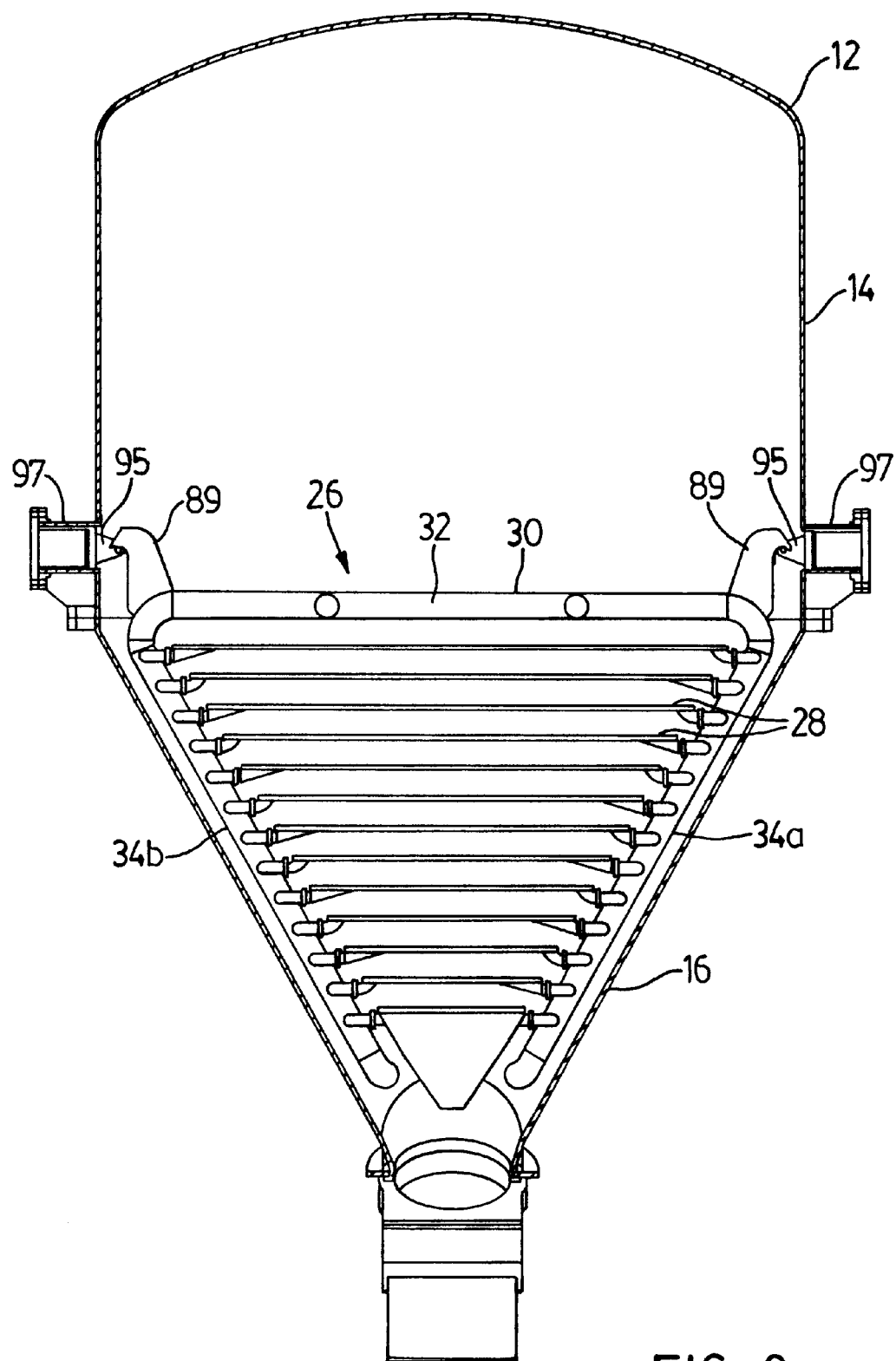
FIG. 8 is a cross-sectional rear elevation of a further embodiment of a pressure plate filter in accordance with a further aspect of the invention.
Figure 9:
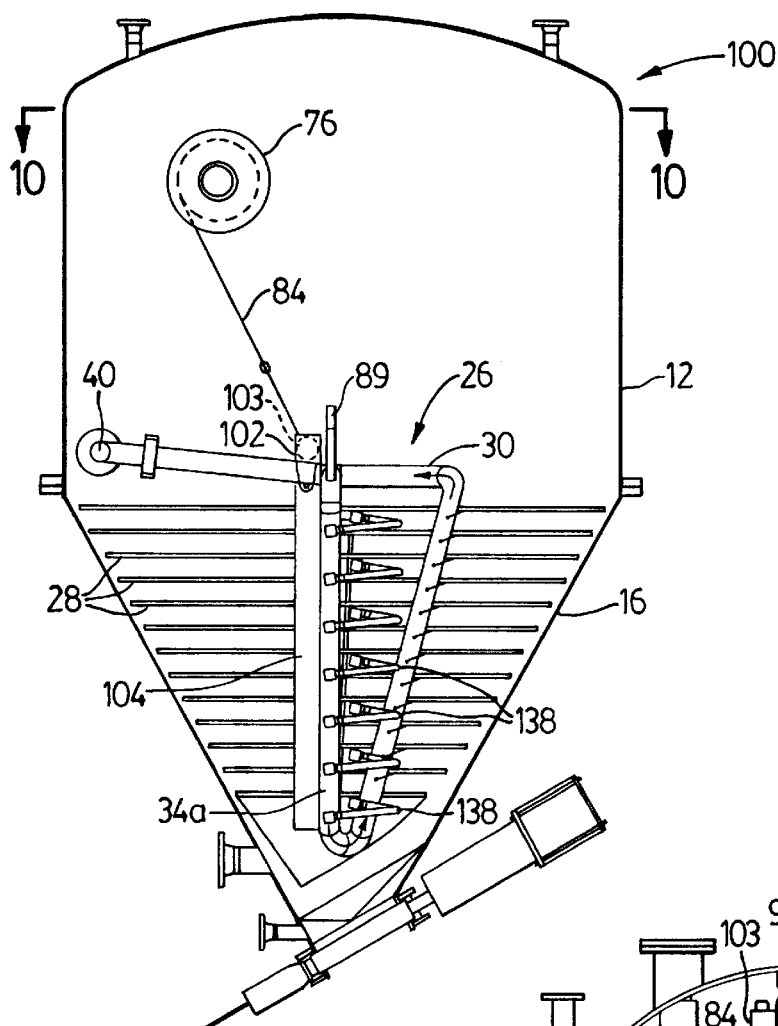
FIG. 9 is a cross-sectional side elevation of a second form of pressure plate filter constructed in accordance with the invention, this view showing the filter plates in the lowered, filtering position.

In one preferred embodiment of the invention which is illustrated in FIG. 8, a pair of special support lugs 95 are mounted within the vessel 12, in place of previously mentioned support lugs 91, for supporting the filter plate assembly 26 in its lowered position. The support lugs 95 include a load cell so that the force applied on the support lugs 95 by the filter plate assembly 26 can be measured. Preferably, the support lugs 95 include plug-in style load cell assemblies which are received within outwardly extending shell nozzles 97 that are provided on the cylindrical upper section 14. One suitable type of load cell assembly is the STRAINSERT (Trade-Mark) Model No. CPA 0.75-1, although the exact type of load cell used in a particular pressure plate filter will depend upon the size of the filter.

As previously mentioned, the support arms 89 are located so that they lie substantially along the gravitational centre line of the filter plate assembly 26 when the assembly is in its lowered position, with the result that the support lugs 95 will support substantially all the weight of the lowered assembly 26. This enables the load cells to measure the weight of the assembly 26 and any material build up on the filter plates 28 before the introduction of slurry to the vessel 12, and at any time during the filtering process. The fact that the load cells measure the weight of the plate assembly 26 directly, rather than measuring the weight of the entire vessel 12, permits more accurate readings to be obtained than if the weight of the entire vessel 12 was taken.

Electrical signals from the load cells can be fed to an external control panel and used to determine (either manually or automatically) the amount of filter cake that has collected on the plates 28, which information can be used to prevent filter cake from bridging between adjacent filter plates. The load cells can also be used to monitor the amount of residual moisture in the filter cake during the drying cycle, and also to indicate if the filter cake discharge process was successfully completed, or if it should be repeated again.

It will be appreciated that in certain applications it is possible that bridging may occur between adjacent filter plates within the pressure plate filter 10. In some cases, the bridging of filter cake between the adjacent filter plates may be such that raising the filter plate assembly 26 to its filtrate discharge position and providing blow back through the filtrate discharge pipes is insufficient to dislodge the filter cake. Such bridging is more likely to occur when double sided filter plates 92 are used in the pressure plate filter 10, than when single sided filter plates 28 are used. A second embodiment of the invention overcomes this bridging problem.

Referring to FIGS. 9 to 14, a second preferred embodiment of a pressure plate filter, indicated generally by 100, in accordance with the invention is illustrated. Except as explained hereinafter, the pressure plate filter 100 is similar in construction and operation to the pressure plate filter 10 described above.

Figures 11, 11A:
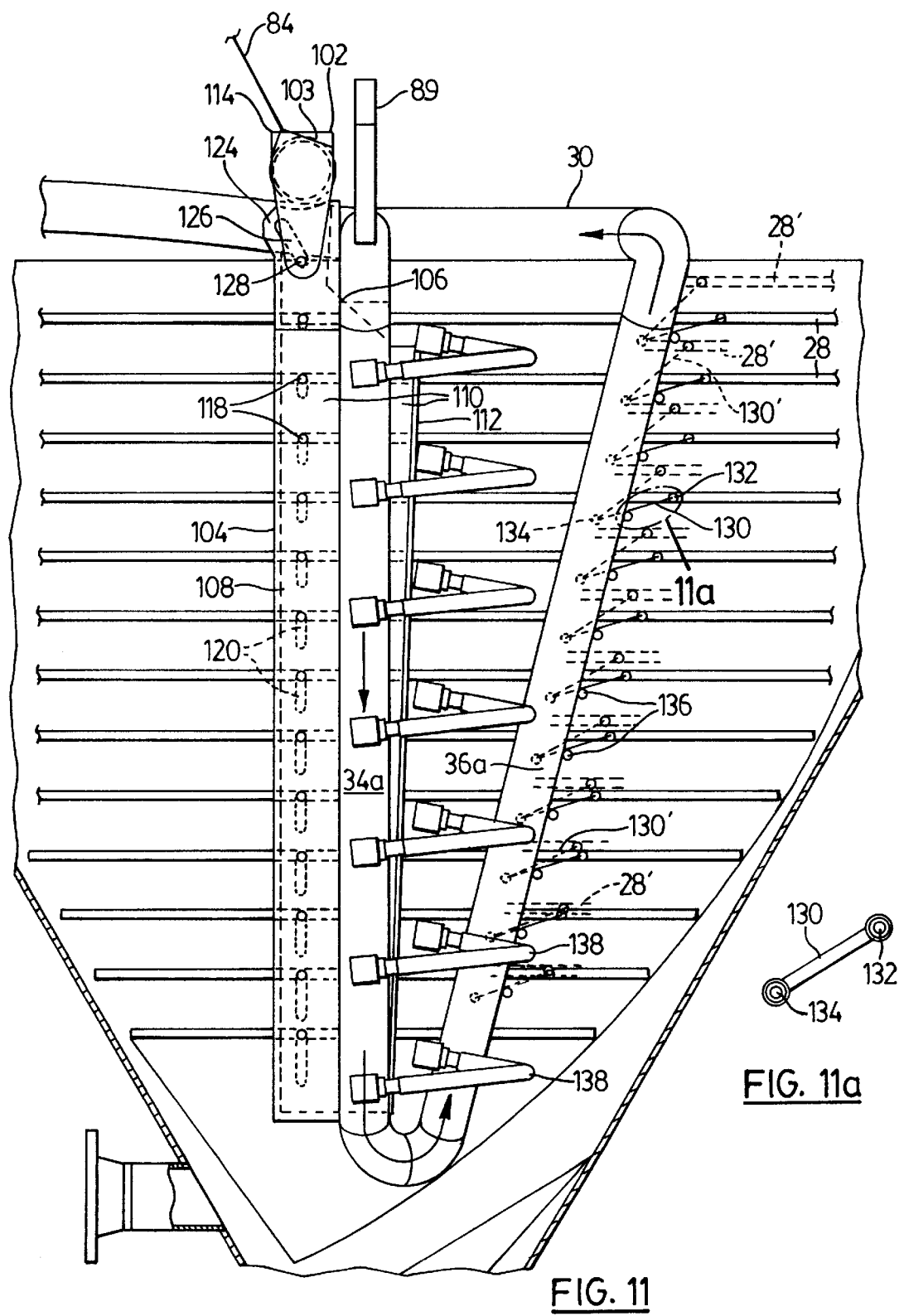
FIG. 11 is a partial cross-sectional side elevation of the pressure plate filter of FIG. 9.
FIG. 11a is a side view of a pivotal linking arm of the pressure plate filter of FIG. 9.

In the pressure plate filter 100, the filter plate assembly 26 can be rotated between a lowered filtering position and a raised filter cake discharge position by the hoist assembly 76. As will be explained in greater detail below, the filter plates 28 are mounted in such a manner that the filter plates will lift and separate from each other when the filter plate assembly 26 rotated to its raised position. In this regard, the filter plates are mounted so that they can move relative to each other between a first position in which they are uniformly spaced and a second position in which they are spaced further apart from each other than in said first position The support frame 30 of the pressure plate filter 100 includes a pair of elongate support plates 104 for supporting the filter plates 28 when the filter plate assembly 26 is in its lowered position. As best seen in FIGS. 11 to 13, one of the support members 104 extends along the back of the filtrate intake pipe 34a for substantially the entire length of the filtrate intake pipe 34a, and the other support member 104 is connected to the other filtrate intake pipe 34b in an identical manner. A number of inwardly directed support stand-offs 116 are provided along each of the support members 104 for supporting the filter plates 28. The support stand-offs 116 are uniformly spaced along the support members 104. Outwardly extending support pins 118 are provided on opposing sides of each of the filter plates 28 for resting on the stand-offs 116 when the pressure plate assembly 26 is in its lowered, filtering position.

The filter plate assembly 26 includes a separating frame 102 having a tubular elongate horizontal lift member 103 which is secured to the hoist assembly 76 by hoist lines 84. The separating frame 102 also includes a pair of separating members 106 each having an elongate portion 108 which has a slotted section 110 and a flange section 112 that are connected together at right angles such that the elongate portion 108 has a generally L-shaped cross section. The separating members 106 each include a vertically extending inverted U-shaped connector 114 at an upper end of its slotted section 110. As best seen in FIG. 12, one of the separating members 106 is connected at its U-shaped connector 114 to one side of the horizontal lift member 103, and the other separating member 106 is similarly connected to the other end of the horizontal lift member 103. The slotted section 110 of each of the separating members 106 includes a number of upwardly extending slots 120 therethrough which are arranged one above another along the length of the section 110.

As best seen in FIGS. 11 through 14, the separating members 106 are arranged relative to the support frame 30 so that the support pins 118 of the filter plates extend through the slots 120 to rest on corresponding support stand-offs 116 when the pressure plate assembly 26 is in its lowered position. Specifically, the separating members 106 are each mounted so that their L-shaped portions 108 extend adjacent to one of the filtrate intake pipes 34a, 34b respectively. The slotted sections 110 each extend adjacent and parallel to one of the support members 106, and the flange sections 112 wrap around the front surfaces of the corresponding filtrate intake pipes 34a or 34b. As best seen in FIG. 11, each slotted section 110 generally increases in width from its lower end to close to its upper end such that the flange section 112 gradually diverges away from the column of slots 120 (from the bottom to top of the slotted section 110). The separating members 106 are mounted such that when the filter plate assembly 26 is in its lowered filtering position, the slotted sections 110 will rest on the inner surface of their corresponding filtrate intake pipes 34a or 34b. When in the lowered position, the lower end of each of the flange sections 112 engages the front surface of its corresponding filtrate intake pipe 34a or 34b, and the upper portion of each flange sections 112 diverges away from the front surface of its corresponding filtrate intake pipe 34a or 34b. The separating members 106 are connected together at the lower ends of their respective L-shaped portions by a horizontally extending connecting member 122, which is partially illustrated in FIG. 12.

The slots 120 vary in length from the top of the separating members 106 to the bottom of the separating members 106 in that the slots 120 become progressively longer the further they are located from the top of the separating member 106. The slots 120 are arranged so that when the filter plate assembly 26 is in its lowered position, a portion of each slot 120 extends below its corresponding pin 118 for at least all of the filter plates 28 in the assembly 26 except perhaps the highest filter plate 28. As best seen in FIGS. 11 and 14, the portion of each slot 120 located beneath its corresponding pin 118 increases from the top of the filter plate assembly 26 to the bottom of the filter plate assembly 26.

As best seen in FIGS. 11 and 12, the upper portion of each of the support members 104 includes a vertically extending connecting portion 124 which has an elongate upwardly extending slot 126 therein. The connecting portions 124 of the support members 104 are slidably received within the inverted U-shaped connectors 114 of the separating members 106 and these interlinking parts act as an interface between the separating frame 102 and the support frame 30. Each separating member 106 is slidably connected to one of the support members 104 by means of a bolt or pin 128 which extends axially through slot 126 and which is rigidly secured at each end to the opposing sides of the inverted U-shaped connector 114 of the separating member 106. Each slot 126 is configured so that a portion of it extends upwardly and rearwardly from its corresponding pin 128 when the filter plate assembly 26 is in its lowered filtering position. Each slot 126 provides a predetermined path along which its corresponding pin 128 can travel.

Figures 10, 10A:
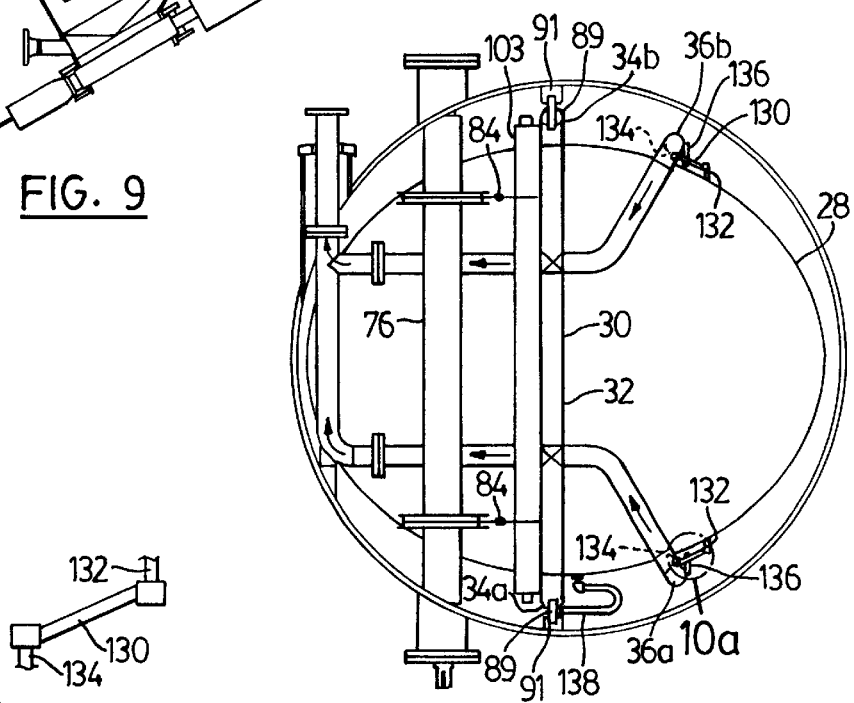
FIG. 10 is a cross-sectional view of the pressure plate filter of FIG. 9, taken along the lines 10—10 of FIG. 9.
FIG. 10a is an exploded view of a portion of FIG. 10.

With reference to FIGS. 10 and 11, the forward portions of each of the filter plates 28 are connected at their opposite side edges to the filtrate removal pipe 36a and 36b, respectively, by rotatable linking arms 130. Horizontally extending mounting pins 132 are provided on the opposite side edges of the filter plates 28, and each linking arm 130 is rotatably mounted at one end to one of these mounting pins 132. Uniformly spaced horizontally extending mounting pins 134 are also provided along the filtrate removal pipes 36a and 36b and each linking arm 130 is rotatably mounted at its opposite end to one of these mounting pins 134. A number of stop members 136 are rigidly connected along each of the filtrate removal pipes 36a and 36b for limiting the downward movement of the pivotal linking arms. A sleeve is preferably provided on each of the pins 132 and 134 for facilitating the rotation of the linking arms 130 on the pins 132 and 134. The linking arms 130 (and their respective stop members 136) together with the support pins 118 (and their respective stand-offs 116), act together to support the filter plates in equally spaced horizontal relation to each other when the filter plate assembly 26 is in its lowered filtering position.

Each of the filter plates 28 is connected to one or the other of the filtrate intake pipes 34a or 34b by a filtrate drain connector 138 which is provided to drain filtrate from its corresponding filter plate 28. The filter plates 28 are preferably connected to the filtrate intake pipes 34a and 34b in an alternating manner such that the immediately adjacent plates in the assembly 26 are each connected by a filtrate drain connector 138 to a different one of the filtrate intake pipes 34a or 34b.

The filtrate drain connectors 138 each have a fluid passageway therethrough which communicates at one end with the filtrate passageway provided through the filtrate intake pipe 34a and 34b to which the connector 138 is connected, and which communicates at its other end with the filtrate collection channel provided in the filter plate 28 to which the connector 138 is connected. The filtrate drain connectors 138 may be constructed of metal tubing which is arranged such that a downward gradient is provided throughout the connector 138 when the filter plate assembly is in its filtering position. If constructed of metal, the drain connectors 138 must be long enough so that they can flex sufficiently to allow the required degree of movement while being subjected to a certain degree of stress.

With reference to FIGS. 9 through 14, the operation of the pressure plate filter 100 will now be described. When the pressure plate assembly 26 of the pressure plate filter 100 is in its lowered filtering position, the support lugs 91 that extend inwardly from the walls of the vessel 12 are engaged by the support arms 89 which are connected to the horizontal support member 32, and accordingly the support lugs 91 support the pressure plate assembly 26 in its lowered filtering position. The pressure plates 28 are supported in an equally spaced parallel horizontal arrangement within the conical section of the vessel 12. They are supported in this position by outwardly extending pins 118 which rest on stand-offs 116, and furthermore by rotatable linking arms 130 which each rest on their corresponding stop members 136. During the filtering cycle, filtrate is collected from the filter plates 28 through the filtrate intake pipes 34a and 34b by means of the filtrate drain connectors 138.

When the filter, wash and drying cycles have been completed as required, the hoist assembly 76 is used to raise the filter plate assembly 26 into a raised filter cake discharge position As with the pressure plate filter 10 described above, the filter plates 28 are rotated about the pivot 40 and out of the conical section 16 of the vessel 12 to a steeply slopping position. However, in the pressure plate filter 100, activation of the hoist assembly begins an initial filter plate separation procedure, prior to the rotation of the filter plate assembly 20, in which the filter plates 28 are separated relative to each other.

When the hoist assembly 76 first starts to reel in the hoist lines 84, the separating frame 102 will initially move independently of the support frame 30 for a predetermined distance along a predetermined path. This is because the hoist lines 84 are not connected directly to the support frame 30, but rather are connected to the horizontal lift member 103 of the separating frame 102. The separating frame 102, in turn, is slidably connected to the support frame 30 by pins 128 which extend through corresponding slots 126. When the hoist assembly 76 is first actuated, the separating frame 102 will be guided in an upwardly direction relative to the support frame 30 as the pins 128 slide within the path defined by the slots 126. The support frame 30 will stay resting on the support lugs 91 in its fully lowered position until the pins 128 hit their point of maximum upwards travel within the slots 126. The time during which the pins 128 travel within their corresponding slots 126 is when the initial filter plate separation procedure occurs.

The slots 126 are each sloped towards the back of the pressure plate filter 100 (i.e. towards the pivot assembly 40), so that in addition to guiding the separating frame 102 in an upwardly direction, the slots 126 will also guide the upper portion of the separating frame 102 in a rearwardly direction. As previously mentioned, when the assembly 26 is in its lowered position, the flange 112 of each of the separating members 106 diverges outward from its corresponding filtrate intake pipe 34a or 34b, and the lower ends of the flanges 112 rest on the front surface of their corresponding filtrate intake pipes. The point at which the lower end of each flange 112 rests against its corresponding filtrate intake pipe 34a or 34b acts effectively as a pivot point for the separating frame 102 such that during the initial filter plate separating procedure, the lifting frame moves upward relative to the support frame 30, and additionally, pivots relative to the support frame 30 about the point at which the lower ends of the flanges 112 slidably engage the filtrate intake pipes 34a and 34b. The separating frame 102 continues to pivot relative to the support frame 30 until the pins 128 reach their point of maximum upwards travel within slots 126. The separating members 106 are configured so that the flange sections 112 will, for their entire length, each be in contact with the front surface of their corresponding filtrate intake pipe 34a or 34b when the pins 128 reach their point of maximum upwards travel at the end of the initial pressure plate separation procedure. This reduces some of the shear forces that are applied to the pins 128 as the assembly 26 is raised after the plate separation procedure.

During the filter plate separation procedure (when the separating frame 102 is moving upwardly and pivoted rearwardly relative to the support frame 30), the separating members 106 successively engage the support pins 118 of the filter plates 28, thus causing the filter plates 128 to rise up off of their respective support stand-offs 116 in an upwardly and rearwardly direction. As the sizes of the slots 120 provided along the support members 104 increase from the top of the filter plate assembly 26 to the bottom of the filter plate assembly 26, the separating members 106 will engage each successively lower plate 28 at a later time than the plate above it was engaged. Accordingly, the highest filter plate 28 will move the greatest distance and the lowest filter plate in the stack will move the least distance relative to their respective support stand-offs 116 during the initial plate separation procedure. As a result the filter plates 28 end up farther apart relative to each other by the time the pin 128 reaches the end of its travel stroke within the slot 126. The relative positions of the filter plates 28 when the pin 128 reaches its upper point of travel within the slot 126 at the end of the plate separation procedure is illustrated by the dashed lines 28' in FIGS. 11 and 12. The dashed lines 102' and 108' indicate the position of the separating frame 102 at the end of the separation procedure. The slotted sections 110 are lifted up off of the inside surfaces of their corresponding filtrate intake pipes 34a and 34b. In FIG. 13, dashed lines 108' and 118' indicate the position of the separating member 108 and pin 118, respectively, at the end of the separation procedure. It will be appreciated that in addition to lifting the filter plates 28, the separating frame 102 also causes the plates 28 (especially those which are higher in the stack) to shift horizontally to the back of the vessel 12. This horizontal shifting is not very significant in magnitude, and decreases for each sequentially lower plate 28. The lowest plate 28 in the filter plate assembly 26 may not move at all during the filter plate separation procedure.

The pivotal linking arms 130 serve to ensure that the filter plates 28 remain parallel to each other during the separation procedure. The dashed lines 130' in FIG. 11 indicates the position of the linking arms 130 at the end of the separation procedure.

The initial pressure plate separation procedure ends and raising of the pressure plate assembly 26 begins when the pins 128 encounter the tops of the corresponding slots 126. At such time, the separating frame 102 and the tubular frame 30 effectively become locked together and the tubular frame 30 and separating frame 102 will begin to rotate together about the pivot assembly 40.

As mentioned above, at the same time the pins 128 reaches the end of their stroke of travel within the slots 126, the flanges 112 also engage, along their full length, the front surface of their corresponding filtrate intake pipes 34a or 34b. The pins 128 engage the support members 104 (and accordingly the support frame) and thus cause the entire filter plate assembly 26 to raise up out of the conical section 16 and into its filter cake discharge position. It will thus be appreciated that the pressure plate filter 100 provides a filter plate assembly in which the filter plates move relative to each other as the filter plate assembly is moved from its lowered position to its raised filter cake discharge position, thereby providing a larger gap between the filter plats 28 in the raised position then exists between the filter plates 28 in the lowered position. This increased gap makes it easier to discharge filter cake from the filter plates 28 when bridging has occurred as the "bridge" will generally be broken as a result of the increased gap.

When the filter plate assembly 26 is placed back in its lowered filtering position, the support frame 30 will come to rest on the support lugs 91, and the separating frame 102 will continue moving downwardly until the pins 128 rests in the lowest, most forward part of their slots 126, at which time the support pins 118 of all the filter plates will rest on their respective support stand-offs 116, and the pivotal linking arms 130 will rest on their respective stop members 136.

Although the pressure plate filter 100 has been described in respect of single sided plates 28, it will be appreciated that it can easily be adapted to be used with double sided filter plates similar to those shown in FIG. 7. In fact, the pressure plate filter 100 would normally have double sided filter plates as bridging is more likely to occur when double sided filter plates are used.

It will be appreciated that the filtrate drain connector 138 could be constructed of a flexible hose of rubber or polymer material instead of steel tubing. Additionally, the support lugs 91 could be replaced with support lugs having strain gages incorporated therein, such as those shown in FIG. 8. Furthermore, it would be possible to use an actuator other than a hoist assembly to move the support frame 30 and separating frame 102.

Figure 15:
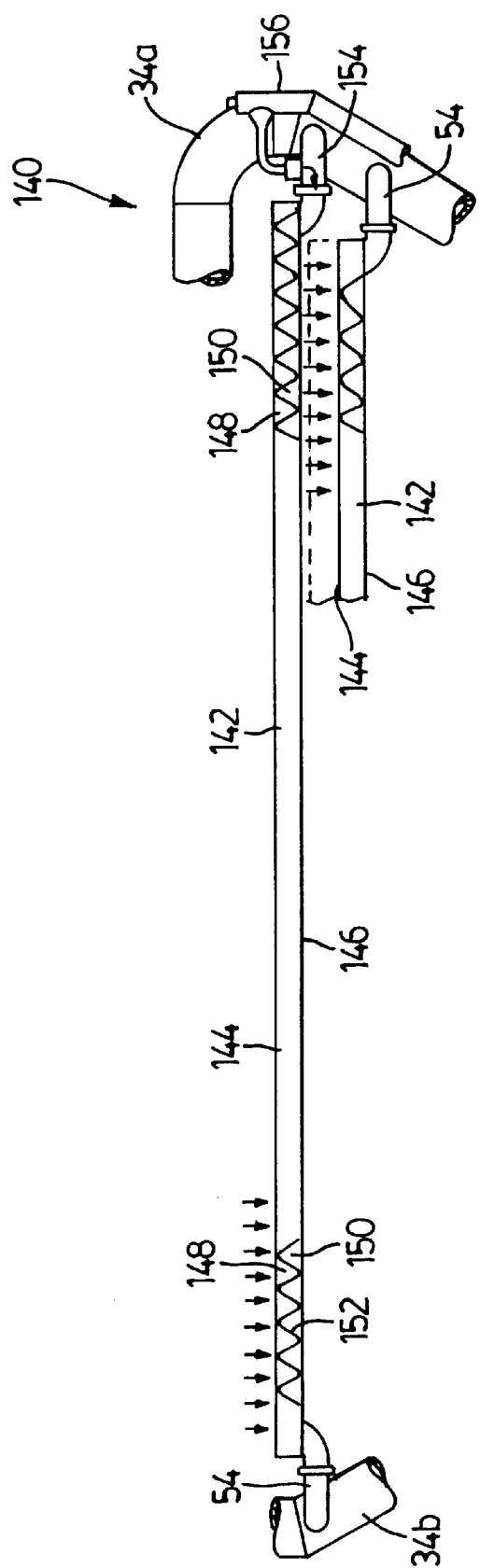
FIG. 15 is a partial cross-sectional side elevation of a further embodiment of a pressure plate filter in accordance with a further aspect of the invention.

FIG. 15 illustrates a partial view of a third embodiment of a pressure plate filter, indicated generally by 140, in accordance with the present invention. The pressure plate filter 140 is similar in construction and operation to the pressure plate filter 10, except as noted below. The pressure plate filter 140 is comprised of a stack of filter plates 142. The upper surface 144 and lower surface 146 of each of the filter plates 142 are covered with perforated fabric which is secured by one or more clamp wires which run around the outside edges of the filter plates 142. Each filter plate 142 is divided into an upper zone 148 and a lower zone 150 by a separation plate 152. The upper zone 148 acts as a filtrate collection zone and is in communication with one of the filtrate intake pipes 34a or 34b through a connector 54. The side of the filter plate 142 which is not supported by a connector 54 to its respective filtrate intake pipe 34a (or 34b as the case may be) is supported by a further connector 154. The lower zone 150 provides a diffusion wash zone for washing the filter cake on the next successive lower filter plate in the filter plate stack. In this regard, the lower zone 150 communicates through the connector 154 with a diffusion wash supply conduit system 156. The diffusion wash conduit system 156 runs along side the filtrate intake pipes 34a and 34b and is attached thereto. The diffusion wash supply conduit 156 and the lower diffusion zones 150 of the filter plates 142 are used to distribute wash liquor on the upper surfaces of the next successively lower filter plates 142 in the filter plate stack during the wash cycle while the vessel is pressurized using gas. In this regard, the filter plates 142 effectively have a built in diffusion plate, the use of which can provide the pressure plate filter 140 with a very high wash efficiency.

It will be appreciated that the pressure plate filter of the present invention could alternatively be used for thickening of suspensions. In such a use, the plate stack would be placed in its raised position for the filtering and discharge steps. When a sufficient layer of solids had been accumulated on the surface of the filter plates then the filtration could be stopped and clear filtrate pumped back into the filter plates in order to discharge the accumulated solids. The solids would be released from the filter surfaces and slide down the slopping surfaces into the cone where they could be accumulated and subsequently pumped away as a thickened slurry.

It will be appreciated that a valve could be placed in the filtrate discharge pipe 46 to isolate the connecting pipe sections 38a and 38b from each other, in which case the alternating manner in which successive filter plates are connected to the filtrate intake pipes 34a and 34b in the pressure plate filters 10 and 100 would permit the filters to be operated with only every second filter plate being active, if desired. Additionally, instead of having one closed end 68 and an open discharge end 70, the discharge pipe 46 could have two open discharge ends protruding from opposite sides of the vessel, in which case the filter plates which drained through filtrate intake pipes 34a could be drained separately from the filter plates which were drained through the filtrate intake pipes 34b. In such a configuration, the filtrate discharge plate 46 would include a valve or possibly a permanent seal to isolate the connecting pipe sections 38a and 38b from each other.

It will also be appreciated that successive filter plates need not be connected to the filtrate intake pipes 34a and 34b in the alternating manner disclosed above, but rather the filter plates could be connected to the filtrate intake pipes so that the plates each drained to the same side (or both sides) of the plate stack.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A pressure plate filter comprising:
    a filter vessel having a cylindrical top section, a conical, downwardly tapering bottom section, a slurry feed inlet for introducing slurry into said vessel, and a filter cake discharge outlet located at said bottom section for removing filter cake from said vessel;
    a support frame;
    a stack of spaced-apart parallel filter plates mounted on said support frame, said filter plates each having a porous, substantially planar filtering surface;
    filtrate collection and removal means for collecting filtrate from said filter plates; and
    a pivot assembly pivotally mounting said support frame within said filter vessel for rotation between a lowered filtering position in which the filtering surfaces of said filter plates extend substantially horizontally and at least some of said filter plates are located within said bottom section, to a raised discharge position in which the filtering surfaces of said filter plates extend at a steep angle and filter cake on said filter plates is discharged therefrom due to force of gravity when said filter is in use.

2. A pressure plate filter according to claim 1 wherein said stack of filter plates extends from an upper portion of said bottom section to a lower portion of said bottom section when said support frame is in said filtering position.

3. A pressure plate filter according to claim 2 wherein said pivot assembly provides a horizontal pivot axis for said support frame and filter plates, said horizontal pivot axis being located above said bottom section and offset to one side from a vertical central axis of said bottom section.

4. A pressure plate filter according to claim 3 wherein said support frame has at least one fluid passageway formed therethrough for collecting filtrate from said filter plates.

5. A pressure plate filter according to claim 4 wherein at least one filtering surface of each filter plate is upward facing when said support frame and filter plates are in said filtering position, and at least some of said filter plates are double sided filter plates having a further filtering surface which is downward facing when said support frame and filter plates are in said filtering position.

6. A pressure plate filter according to claim 3 wherein said support frame includes two filtrate intake pipes each having a fluid passageway formed therethrough for collecting filtrate from filter plates, said filtrate intake pipes each extending along opposite sides of said stack of filter plates, each of said filter plates being connected to a respective one of said filtrate intake pipes by a connecting pipe such that a filtrate discharge path is provided from the filter plate to the fluid passageway of the respective filtrate intake pipe.

7. A pressure plate filter according to claim 6 wherein each successively lower filter plate in said stack of filter plates is smaller than the filter plate located above it.

8. A pressure plate filter according to claim 6 wherein said support frame includes two filtrate removal pipes each having an upper end and a lower end with a fluid passageway extending therebetween, said filtrate removal pipes extending along opposite sides of said stack of filter plates, the lower end of each filtrate removal pipe being connected to a lower end of a corresponding one of said filtrate intake pipes, the upper end of each of said filtrate removal pipes being connected by a horizontally extending connecting pipe section to a filtrate discharge pipe extending along said horizontal pivot axis.

9. A pressure plate filter according to claim 8 wherein inwardly extending support pins are provided on said filtrate removal pipes and provide additional support for said filter plates.

10. A pressure plate filter according to claim 9 wherein a horizontally extending support member extends between and connects an upper end of each of said filtrate intake pipes.

11. A pressure plate filter according to claim 8 wherein a portion of said filtrate discharge pipe extends through a sleeve bearing in said top section of said vessel.

12. A pressure plate filter according to claim 3 wherein a downwardly tapering plug member is located underneath a lowest filter plate in said stack of filter plates.

13. A pressure plate filter according to claim 3 wherein the filtering surfaces of said filter plates are angled at greater than 50 degrees from horizontal when said support frame and the filter plates are in said discharge position.

14. A pressure plate filter according to claim 2 including a hoist means for moving said support frame and said filter plates between said filtering position and said discharge position.

15. A pressure plate filter according to claim 1 wherein said filter cake discharge outlet is located at the very bottom of said bottom section and is angled so that one side of said outlet is higher that the other side of said outlet, said pressure plate filter including a slurry outlet in said bottom section, at least a portion of said slurry outlet being lower than the highest point of said filter cake discharge outlet.

16. A pressure plate filter comprising:
  a filter vessel having a cylindrical top section, a conical, downwardly tapering bottom section, a slurry feed inlet, a pressurized gas inlet and a filter cake discharge outlet;
  a support frame;
  a stack of spaced apart parallel filter plates mounted on said support frame, said filter plates each having a substantially planar filtering surface:
  a pivot assembly pivotally mounting said support frame within said filter vessel for pivoting about a horizontal axis between a lowered filtering position where the filtering surfaces of said filter plates extend substantially horizontally, and a raised filter cake discharge position where the filtering surfaces of said filter plates extend at a slope, said horizontal axis being located above said bottom section and offset to one side of a vertical central axis of said bottom section; and
  filtrate collection and removal means for collecting filtrate from said filter plates and removing said collected filtrate from said vessel.

17. A pressure plate filter according to claim 16 wherein said stack of filter plates is located substantially within said bottom section when in said lowered filtering position, and said stack of filter plates is substantially above said bottom section when in said filter cake discharge position.

18. A pressure plate filter according to claim 17 wherein said filtrate collection and removal means includes at least one fluid passageway provided through said support frame for collecting filtrate from said filter plates.

19. A pressure plate filter according to claim 18 wherein said top and bottom sections of said vessel are releasably secured together by a plurality of removable fasteners.

20. A pressure plate filter according to claim 17 wherein at least some of said filter plates have a substantially elliptical shape and said support frame includes two filtrate intake pipes each having a fluid passageway formed therethrough for collecting filtrate from filter plates, said filtrate intake pipes extending along opposite sides of said elliptical filter plates that are separated by the minor axis of said elliptical filter plates, each of said filter plates being connected to a respective one of said intake pipes by a connecting pipe having a fluid passageway in communication with said filter plate and with the fluid passageway in the respective intake pipe.

21. A pressure plate filter according to claim 20 including a downwardly tapering plug member located under a lowest filter plate in said stack of filter plates.

22. A pressure plate filter according to claim 20 wherein said filter cake discharge outlet truncates said bottom section and is angled so that one side of said outlet is higher that the other side of said outlet, said pressure plate filter including a slurry outlet in said bottom section, at least a portion of said slurry outlet being lower than the highest point of said filter cake discharge outlet.

23. A pressure plate filter according to claim 16 including at least one load cell upon which said support frame is supported when in said filtering position, wherein in use said load cell can generate an electrical signal indicative of the amount of filter cake on said filter plates.

24. A pressure plate filter according to claim 16 including separating frame means mounted on said support frame for moving said filter plates apart relative to each other when said support frame is moved from said filtering position to said filter cake discharge position.

25. A pressure plate filter comprising:

a filter vessel having a slurry inlet, a gas inlet and a filter cake discharge outlet;

a filter plate assembly having a stack of spaced apart filter plates each with a substantially planar filtering surface, a support frame for supporting said filter plates, and mounting means mounting said filter plates on said support frame such that said filter plates can be moved relative to each other between a first position and a second position, said filter plates being spaced further apart from each other in said second position than in said first position, said filter plate assembly including filtrate passageways for collecting filtrate from said filter plates and discharging the collected filtrate outside of said filter vessel;

a pivot assembly for pivotally mounting said filter plate assembly within said filter vessel so that said filter plate assembly can be pivoted between a lowered filtering position in which said filter plates are supported with their filtering surfaces extending substantially horizontally, to a raised discharge position in which said filter plates are supported with their filtering surfaces in a sloped position for discharge of filter cake from the filter plates; and actuator means for moving said filter plates from said first positions to said second position and pivoting said filter plate assembly from said lowered filtering position to said raised discharge position.

26. A pressure plate filter according to claim 25 wherein said mounting means includes:

a separating frame connected to said actuator means and mounted for movement relative to said support frame for moving said filter plates from said first position to said second position.

27. A pressure plate filter according to claim 26 wherein said separating frame is slidably mounted to said support frame and includes means for engaging said separating frame such that when said filter plate assembly is in said lowered filtering position activation of said actuator means causes said separating frame to move an initial predetermined distance relative to said support frame to effect movement of said filter plates from said first position to said second position, and after said separating frame has moved said initial predetermined distance continued activation of said actuator means causes said separating frame to engage said support frame and said frames to pivot about said horizontal axis until said filter plate assembly is in said raised discharge position.

28. A pressure plate filter according to claim 27 wherein said filter vessel has a cylindrical top section and a conical, downwardly tapering bottom section, said stack of filter plates being positioned within said bottom section when in said lowered filtering position and above said bottom section when in said raised discharge position.

29. A pressure plate filter according to claim 28 wherein said support frame includes two filtrate intake pipes extending along opposite sides of said stack of filter plates, said filtrate intake pipes each having a support member having a number of support standoffs for supporting said filter plates.

30. A pressure plate filter according to claim 29 wherein outwardly extending support pins are provided on opposite side edges of said filter plates for engaging said support standoffs when said filter plate assembly is in said lowered filtering position, and said filter plates are each connected to one of said filtrate intake pipes by a flexible filtrate discharge connector which has a filtrate passageway therethrough.

31. A pressure plate filter according to claim 30 wherein said separating frame includes two elongate separating members having a number of slots located along the length thereof, said separating members being arranged so that one of said separating members extends adjacent one of said filtrate intake pipes and the other of said separating members extends adjacent to the other of said filtrate intake pipes and each of said support pins extends through one of said slots so that when said separating frame is moved said initial predetermined distance said separating members will engage said pins and cause said filter plates to move from said first position to said second position.

32. A pressure plate filter according to claim 31 wherein said slots successively increase in length from an upper end of said separating members to a lower end of said separating members.

33. A pressure plate filter according to claim 32 wherein said support frame includes two filtrate removal pipes each having an upper end and a lower end with a fluid passageway extending therebetween, said filtrate removal pipes extending along opposite sides of said stack of filter plates, the lower end of each filtrate removal pipe being connected to a lower end of a corresponding one of said filtrate intake pipes, the upper end of each filtrate removal pipe being connected by a connecting pipe section to a filtrate discharge pipe about which said support frame pivots.

34. A pressure plate filter according to claim 33 wherein said filter plates are connected at their opposite side edges to said filtrate removal pipes by rotatable connecting means which each comprise a rigid connecting link that is pivotally connected at one end to one side edge of one of said filter plates and pivotally connected at an other end to one of said filtrate removal pipes, and a stop member which is provided on said filtrate removal pipes for limiting downward movement of said connecting link.

35. A pressure plate filter according to claim 34 wherein said actuator means includes a hoist assembly located in an upper portion of said cylindrical upper section which is connected to said separating frame by at least one hoist line.

36. A pressure plate filter according to claim 34 wherein at least some of said filter plates include a porous, substantially planar wash diffusion surface on a lower side thereof for distributing wash liquor on a lower adjacent filter plate, said at least some filter plates having a filtrate collection area that is in communication with said filtering surface and a separate diffusion wash area that is in communication with said diffusion surface, said pressure plate filter including diffusion wash conduit means for supplying wash liquor to said diffusion wash areas of said at least some of said filter plates.

37. A pressure plate filter comprising:

an enclosed filter vessel having a top section, a tapering bottom section, a slurry feed inlet for introducing slurry into said vessel, and a filter cake discharge outlet located at said bottom section for removing filter cake from said vessel;

a pivotal support frame mounted in said vessel and extending vertically in said bottom section, said support frame being pivotal relative to and inside said vessel;

a stack of spaced-apart parallel filter plates mounted on said support frame, said filter plates each having a porous, substantially planar filtering surface on an upper side thereof;

filtrate collection and removal means for collecting filtrate from said filter plates;

a pivot assembly pivotally mounting said support frame for pivoting said support frame and said filter plates between a lowered filtering position in which the filtering surfaces of said filter plates extend substantially horizontally and at least some of the filter plates are located within said bottom section and a raised discharge position in which the filtering surfaces extend at a substantial angle to a horizontal plane so that filter cake on said filter plates falls therefrom under force of gravity; and a lifting mechanism for raising and lowering said support frame and said filter plates between said filtering position and said discharge position.

38. A pressure plate filter according to claim 37 wherein said stack of filter plates extends from an upper portion of said bottom section to a lower portion of said bottom section when said support frame is in said filtering position.

39. A pressure plate filter according to claim 38 wherein said pivot assembly provides a horizontal pivot axis for said support frame and filter plates, said horizontal pivot axis being located above said bottom section and offset to one side from a vertical central axis of said bottom section, which is conical in shape.

40. A pressure plate filter according to claim 38 wherein a downwardly tapering plug member is located underneath a lowest filter plate in said stack of filter plates.

41. A pressure plate filter according to claim 37 wherein said lifting mechanism is a hoist assembly mounted in said top section of said vessel, said hoist assembly including at least one rotatable pulley wheel and a chain extending from the or each pulley wheel to said support frame and connected thereto.

42. A pressure plate assembly according to claim 37 including a mounting system for mounting said filter plates on said support frame so that said filter plates are moved relative to each other when said support frame and said filter plates are pivoted between said filtering position and said raised discharge position, said filter plates being spaced further apart from each other in said raised discharge position than in said filtering position.

* * * * *